US010628276B2

(12) United States Patent
Shinge et al.

(10) Patent No.: US 10,628,276 B2
(45) Date of Patent: Apr. 21, 2020

(54) UNIT TEST FRAMEWORK FOR TESTING CODE IN A GATEWAY SERVICE

(71) Applicant: International Business Machines Corporation, Armonk, NY (US)

(72) Inventors: Rahul S. Shinge, San Jose, CA (US); Eric Simon, Oronoco, MN (US); Quinn Li, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/023,345

(22) Filed: Jun. 29, 2018

(65) Prior Publication Data

US 2020/0004665 A1    Jan. 2, 2020

(51) Int. Cl.
| | | |
|---|---|---|
| G06F 9/44 | (2018.01) | |
| G06F 11/22 | (2006.01) | |
| G06F 11/36 | (2006.01) | |
| H04L 12/26 | (2006.01) | |
| H04L 29/06 | (2006.01) | |
| H04L 12/24 | (2006.01) | |

(52) U.S. Cl.
CPC ...... *G06F 11/2294* (2013.01); *G06F 11/3688* (2013.01); *G06F 11/3692* (2013.01); *G06F 11/3696* (2013.01); *H04L 43/00* (2013.01); *H04L 43/50* (2013.01); *H04L 63/1433* (2013.01); *H04L 41/5054* (2013.01)

(58) Field of Classification Search
CPC .. G06F 11/28; G06F 11/2294; G06F 11/3688; H04L 43/50; H04L 43/00; H04L 41/5041; H04L 41/5054
See application file for complete search history.

(56) References Cited

U.S. PATENT DOCUMENTS

| | | | |
|---|---|---|---|
| 7,218,895 B1 * | 5/2007 | Raghavan | H04L 43/50 455/67.13 |
| 8,160,572 B2 | 4/2012 | Bovet | |
| 8,255,198 B2 | 8/2012 | Krishnaswamy et al. | |
| 9,451,252 B2 | 9/2016 | Chen et al. | |
| 9,497,100 B2 | 11/2016 | Chakrabarti et al. | |
| 9,736,028 B2 | 8/2017 | Ansari et al. | |
| 9,739,801 B2 | 8/2017 | Anderson et al. | |
| 2003/0028803 A1 * | 2/2003 | Bunker, V | H04L 43/00 726/4 |

(Continued)

OTHER PUBLICATIONS

Felipe Meneses Besson, "A framework for automated testing of web service choreographies", Master Thesis, Sao Paulo, Aug. 2011, 37 pgs <Besson_test.pdf>.*

(Continued)

*Primary Examiner* — Tuan A Vu

(74) *Attorney, Agent, or Firm* — Nicholas D. Bowman; Hunter E. Webb; Keohane & D'Alessandro PLLC

(57) ABSTRACT

Aspects of the present invention provide an approach for integrated testing of gateway appliance software services. In an embodiment, a test request is received at a unit test framework installed on the gateway appliance. The unit test framework dynamically generates a set of stub code for processing the test request. This set of stub code executes target code (e.g., code that is being tested) of the software services. Results of the execution are verified to determine whether the code passes the test.

20 Claims, 6 Drawing Sheets

(56) References Cited

U.S. PATENT DOCUMENTS

2013/0297973 A1* 11/2013 Hyland .................. G06F 11/28
  714/27
2016/0014004 A1   1/2016 Bergeron et al.
2018/0321918 A1* 11/2018 McClory ............. H04L 41/5041

OTHER PUBLICATIONS

"Juxy Project Home", http://juxy.tigris.org/, Mar. 28, 2018, 7 pgs.
"XMLSpy XML Editor", https://www.altova.com/xmlspy-xml-editor, Mar. 28, 2018, 32 pgs.
"XSL Coprocessor Services", IBM Knowledge Center, https://www.ibm.com/support/knowledgecenter/en/SS9H2Y_7.1.0/com.ibm.dp.doc/xslcop, Jun. 28, 2018, 2 pgs.
Dave Carver, "XSLT Project/UserGuide/Launching", https://wiki.eclipse.org/XSLT_Project/UserGuide/Launching, Oct. 24, 2009, 4 pages.

* cited by examiner

UNIT TEST FRAMEWORK FOR TESTING CODE IN A GATEWAY SERVICE

TECHNICAL FIELD

The subject matter of this invention relates generally to network communications. More specifically, aspects of the present invention provide a solution for more effectively testing gateway service software code in a network computing environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Providers in the networked computing environment often deliver services online via a remote server, which can be accessed via a web service and/or software, such as a web browser. Individual clients can run virtual machines (VMs) that utilize these services and store the data in the networked computing environment. This can allow a single physical server to host and/or run many VMs simultaneously.

To facilitate access by the potentially large number of external clients to the VMs, solutions, such as software-defined networking (SDN), have been developed that virtualize network communications so that one or more hardware devices can be utilized as a gateway. In operation, these hardware devices are not utilized directly in accessing individual VMs, which can allow network connections to be created with multiple VMs through a single gateway device.

In order to perform these tasks, a set of software services referred to as a gateway appliance is often utilized. This gateway appliance sits in the gateway device (e.g., the edge network) and hosts validation services that authenticate and/or authorize end users. Typically, development of these services is done through flows, gateway internal APIs, and less popular programming languages such as XSLT. Once these services are developed, testing of the services prior to installation in production is important to ensure that the gateway appliance functions correctly.

SUMMARY

In general, aspects of the present invention provide an approach for integrated testing of gateway appliance software services. In an embodiment, a test request is received at a unit test framework installed on the gateway appliance. The unit test framework dynamically generates a set of stub code for processing the test request. This set of stub code executes target code (e.g., code that is being tested) of the software services. Results of the execution are verified to determine whether the code passes the test, and output the result through the cloud computing environment to the user interface of test client.

One aspect of the present invention includes a method for integrated testing of gateway appliance software services in a networked computing environment, comprising: receiving a test request at a unit test framework on a gateway appliance; dynamically generating, by the unit test framework, a set of stub code for processing the test request; executing target code of the software services using the set of stub code; and verifying a result of the execution of the target code.

Another aspect of the present invention includes a computer program product embodied in a computer readable medium that, when executed by a computer device, performs a method for integrated testing of gateway appliance software services in a networked computing environment, the method comprising: receiving a test request at a unit test framework on a gateway appliance; dynamically generating, by the unit test framework, a set of stub code for processing the test request; executing target code of the software services using the set of stub code; and verifying a result of the execution of the target code.

Yet another aspect of the present invention includes a computer system for integrated testing of gateway appliance software services in a networked computing environment, the computer system comprising: a hardware gateway, having a gateway appliance that controls the hardware gateway; a unit test framework installed in the gateway appliance; a memory medium comprising instructions; a bus coupled to the memory medium; and a processor coupled to the bus that when executing the instructions cause the system to: receive a test request at a unit test framework on a gateway appliance; dynamically generate, by the unit test framework, a set of stub code for processing the test request; execute target code of the software services using the set of stub code; and verify a result of the execution of the target code.

BRIEF DESCRIPTION OF THE DRAWINGS

These and other features of this invention will be more readily understood from the following detailed description of the various aspects of the invention taken in conjunction with the accompanying drawings in which.

Figure 1:
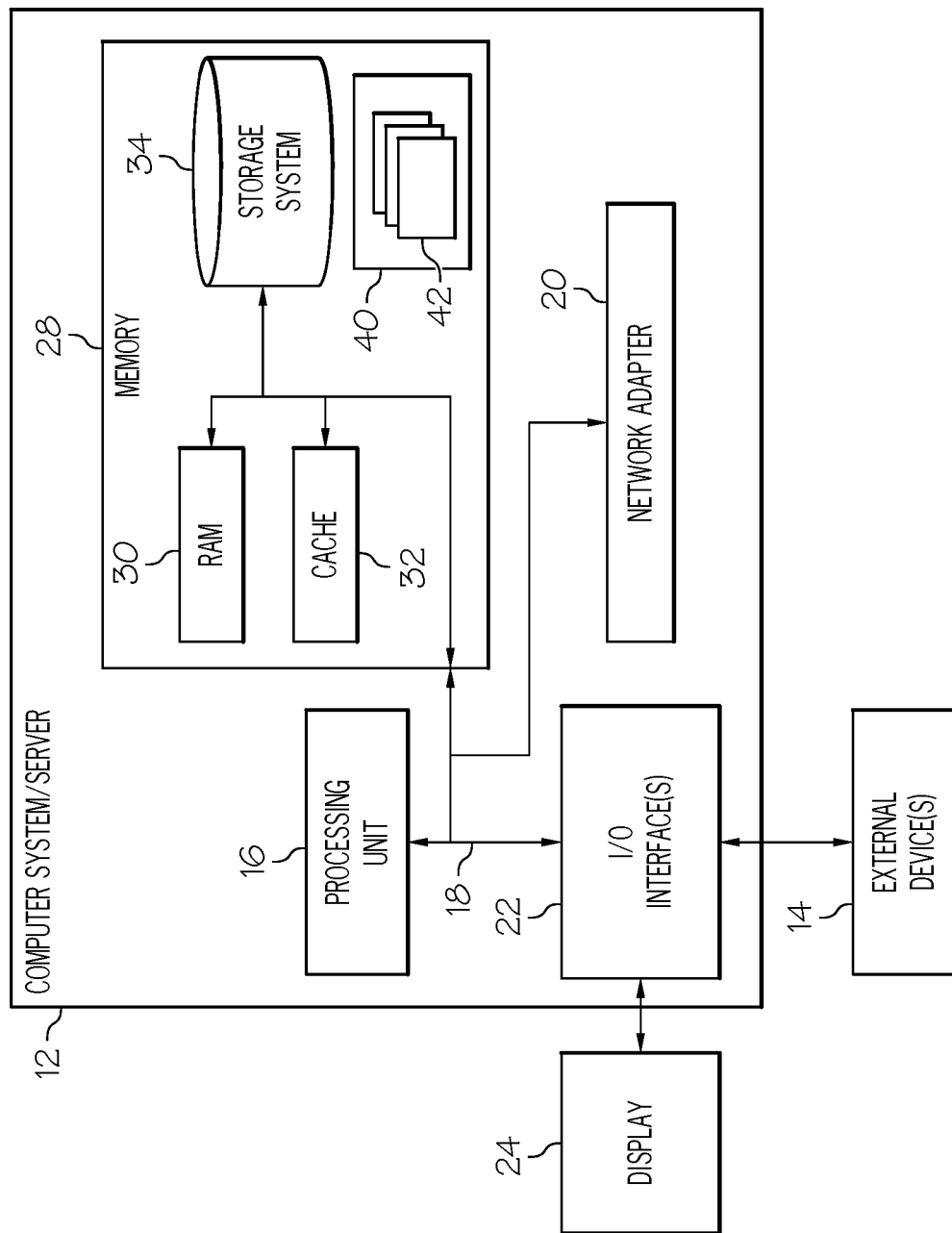
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for integrated testing of gateway appliance software services. In an embodiment, a test request is received at a unit test framework installed on the gateway appliance. The unit test framework dynamically generates a set of stub code for processing the test request. This set of stub code executes target code (e.g., code that is being tested) of the software services. Results of the execution are verified to determine whether the code passes the test.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
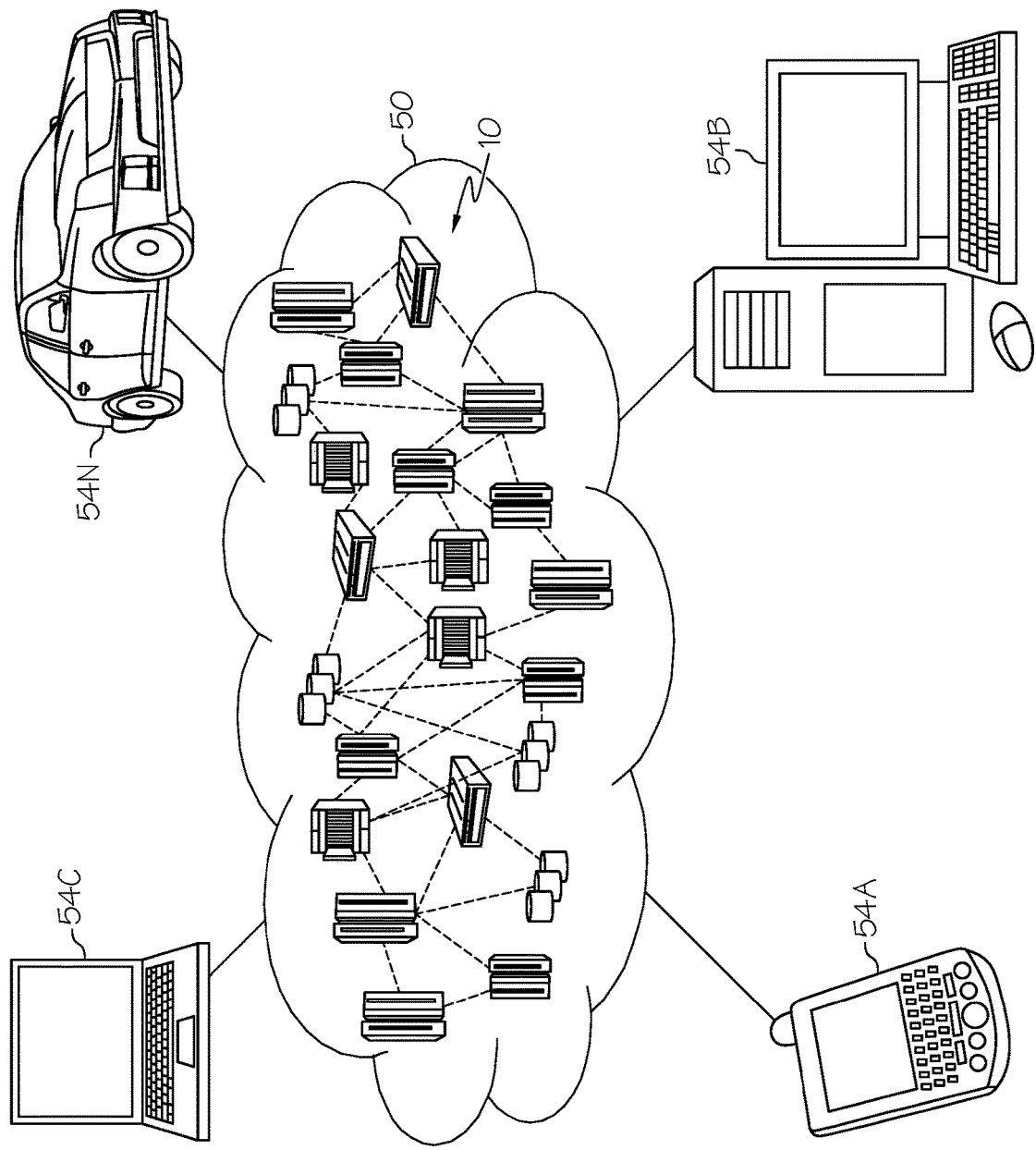
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
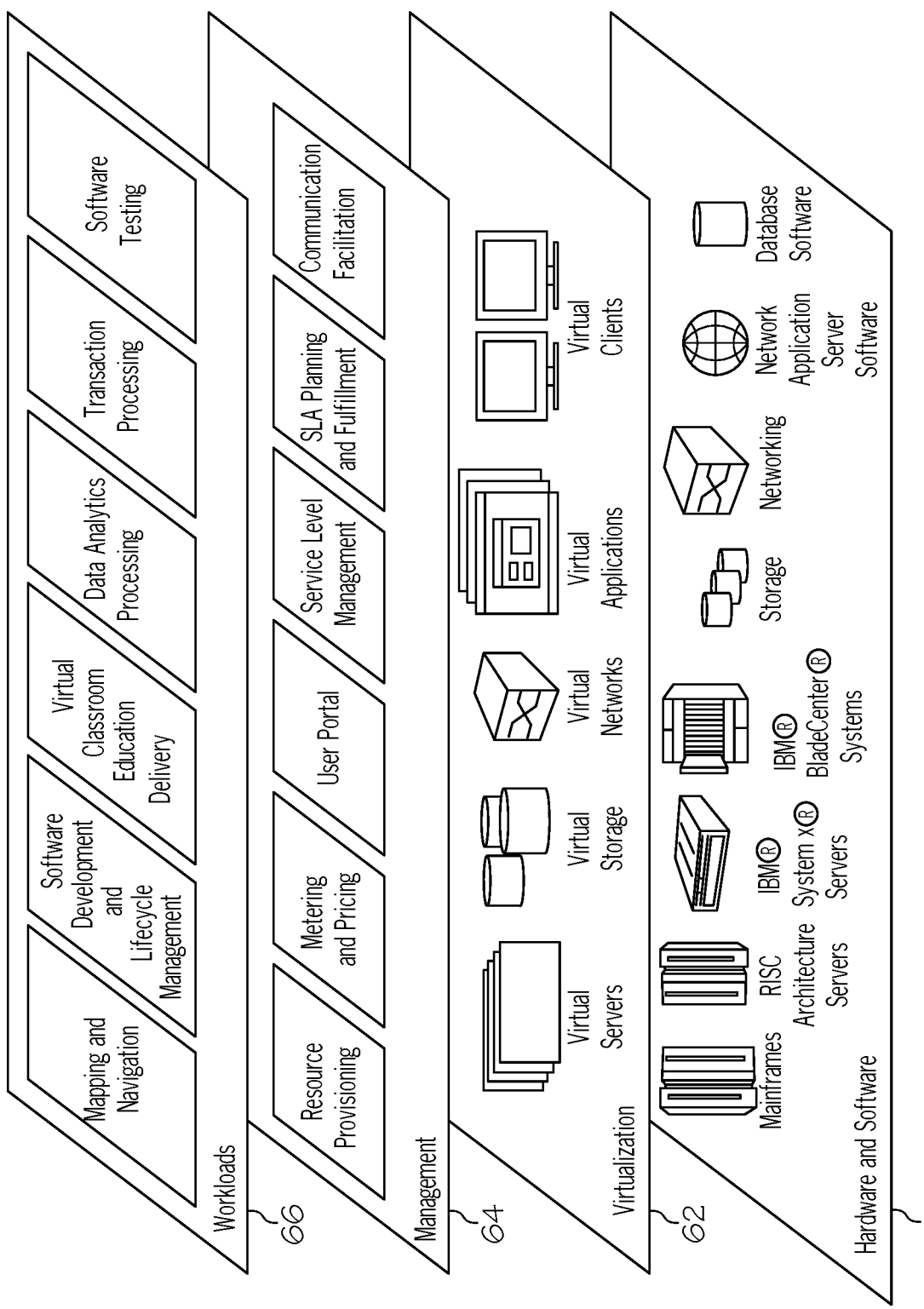
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is communication facilitation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and software testing. As mentioned above, all of the foregoing examples described with respect to FIG. 3 are illustrative only, and the invention is not limited to these examples.

It is understood that all functions of the present invention as described herein typically may be performed by the communication facilitation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
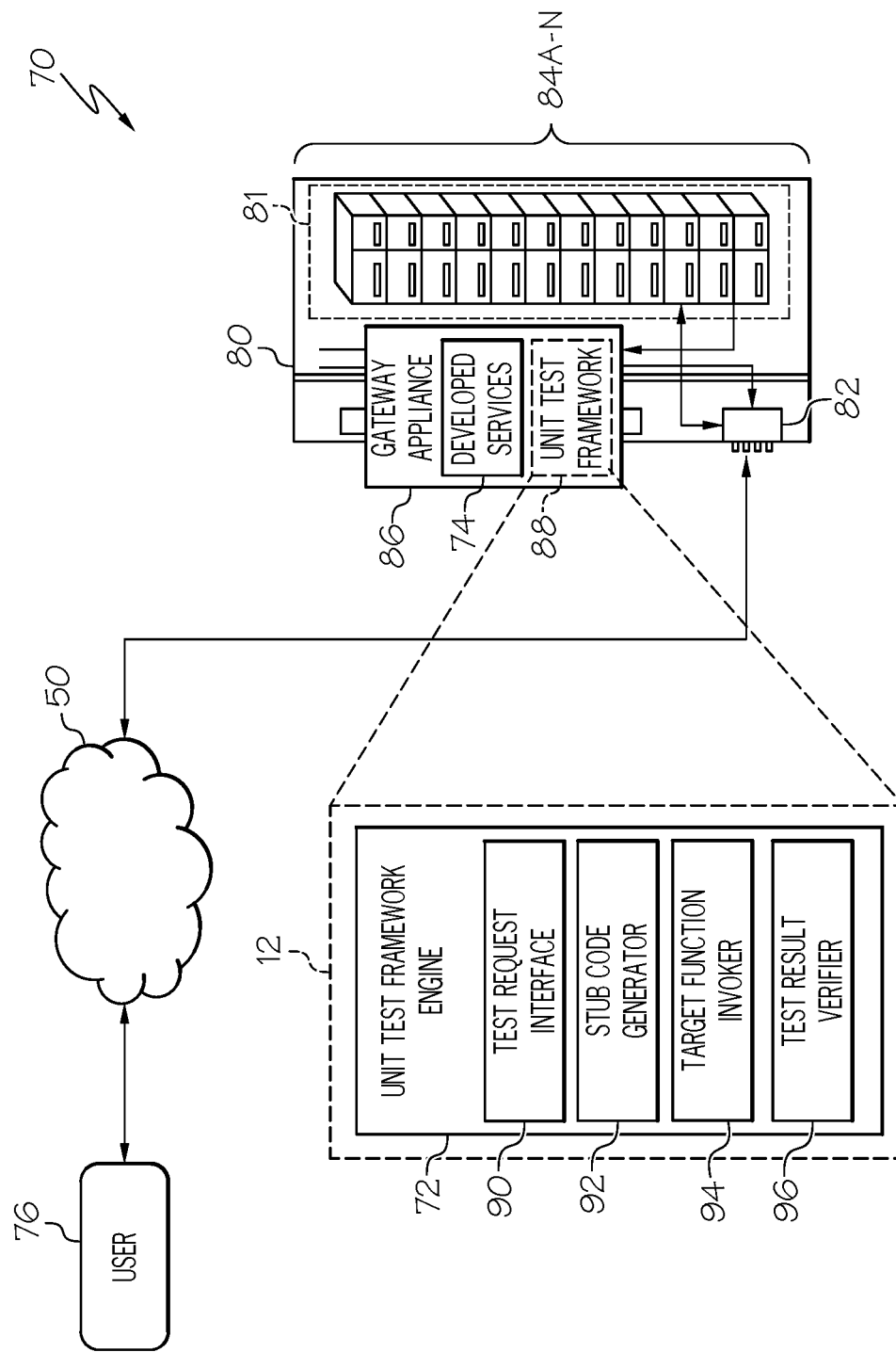
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment). A stand-alone computer system/server 12 is shown in FIG. 4 for illustrative purposes only. In the event the teachings recited herein are practiced in a networked computing environment 70, each physical server 80 need not have a unit test framework engine (hereinafter "system 72"). Rather, system 72 could be loaded on a server or server-capable device that communicates (e.g., wirelessly) with the physical server 80 to provide integrated testing of gateway appliance software services therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for brevity purposes.

Along these lines, system 72 may perform multiple functions similar to a general-purpose computer. Specifically, among other functions, system 72 can provide integrated testing of gateway appliance software services (e.g., developed services 74) in a networked computing environment 70. To accomplish this, system 72 can include: a test request interface 90, a stub code generator 92, a target function invoker 94, and a test result verifier 96.

As shown, server 80 can host and/or provide connections for a user 76 attempting to access one or more of a number of computing nodes 84A-N. One or more of computing nodes 84A-N can be or include a traditional virtual machine (VM) instance. Such a VM instance can be included in a computing node 84N as a virtual server on physical server 80. It should be understood that a VM instance is different from a process virtual machine. A process virtual machine is a platform dependent engine, such as a Java® Virtual Machine, that executes platform independent code written in a high-level programming language, such as Java, for performing a specific task (Java and Java Virtual Machine are trademarks of Oracle and/or its affiliates in the United States and/or elsewhere). In contrast, a VM instance is a virtual system that simulates an entire computing environment. To this extent, rather than performing only a single task, a VM instance is an environment, can include an operating system, middleware, one or more applications, and/or the like, within which a variety of tasks, functions, operations, etc., can be carried out by a user, such as by executing one or more applications thereon. As such, a VM instance can be made to simulate a stand-alone computer system in the eyes of user 76.

To this extent, in a VM instance-type environment, server 80 can includes a virtualization hypervisor 81 at the lowest level. Virtualization hypervisor 81 can run directly on the physical server 80, referred to as a bare metal (BM) configuration, or, alternatively, can run on a server operating system running on the physical server 80. In any case, virtualization hypervisor 81 provides a platform that allows multiple "guest" virtual server 84A-N systems to run concurrently on the physical server 80. To this extent, virtualization hypervisor 81 provides an abstraction level between the hardware level of physical server 80 and the higher level software functions of each virtual server 84N. In order to provide these software functions, each virtual server-based computing node 84N can contain everything that is necessary to simulate a "guest" instance of a particular virtual server on physical server 80 via virtualization hypervisor 81. To this extent, computing node 84N includes an operating system, middleware, one or more applications and/or the like.

Additionally or in the alternative, one or more of computing nodes 84A-N can be or include a container virtual machine (VM) such as may be found in the container-based networked computing environment. Unlike with traditional VM instances, a container VM does not include a virtualization hypervisor 81 at the lowest level. Rather, in a container-based networked computing environment, an operating system runs directly in a bare metal (BM) configuration on the physical server 80 and one or more containers run on the same operating system. As with a VM instance, containers can each provide middleware, one or more applications, and/or the like. However, because the operating system is running in a BM configuration, no operating system need be included within the computing node 84A-N itself. This allows any container to be made operational more quickly than a traditional hypervisor-based VM instance, while still maintaining the functional independence and other characteristics thereof.

In any case, to provide a network connection over network 50 between user 76 and computing nodes 84A-N, physical server 80 can include a hardware gateway 82. Hardware gateway 82 is a hardware communications device that establishes the routing protocols between the physical server 80 and the network 50. Further, gateway appliance 86, which may include an SDN controller, virtualizes network communications so that hardware gateway(s) 82 are not utilized directly by individual computing nodes 84N, allowing greater numbers of communications between computing nodes 84A-N and user 76 over network 50. All or portions of gateway appliance 86 can be included within hypervisor 81 or can be executed on BM physical server 80 (e.g., within or on top of the BM OS). Additionally, or in the alternative, all or portions of gateway appliance 86 can be included within hypervisor 81, for example, as a stand-alone utility, as a component of computing node 84N, and/or as a stand-alone computing node 84N on physical server 80, as further described in U.S. patent application Ser. No. 14/946,948.

As stated above, gateway appliance 86 sits in the gateway device (e.g., the edge network) and hosts validation services that authenticate and/or authorize end users. Typically, development of these services 74 is done through flows, gateway internal APIs, and less popular programming languages such as XSLT. Once these services 74 are developed, testing of the services prior to installation in production is important to ensure that the gateway appliance functions correctly.

The inventors of the invention described herein have discovered certain deficiencies in the current solutions for testing developed services 74. For example, for physical servers 80 and other products that use gateway appliances 86 like IBM Datapower, implementing automated tests can be extremely problematic. Currently, in order to test developed services 74, the gateway code must be stored and executed directly on the gateway appliance 86 itself. This currently requires the gateway appliance 86 to be taken offline from performing its normal runtime environment, which can lead to rushed testing that may result in developed services 74 being placed into production without adequate testing. Another major problem with testing developed services 74 of gateway code is that gateway appliances 86 running on physical gateways 82 are designed only to process incoming requests (e.g., HTTP requests) and to return responses to these requests. Because of this, testing at the regular gateway HTTP request/response interface is typically not adequate for getting detailed automatic test results because much of the logic is never visible at the public interface level. As such, tests conducted in this way are currently unable to verify a large amount of the functionality of developed services 74.

Certain embodiments of the present invention may offer various technical computing advantages, including the ability to perform automated testing of developed services 74 in the integrated environment of the gateway appliance 86 without requiring that the gateway appliance 86 cease the performance of its usual runtime environment jobs. Further, certain embodiments of the present invention provide an integrated testing framework that provides the ability to test individual functions before incorporating the entire solution, allow validation of HTTP headers set by internal APIs, and view detailed results of these functions. Still further, certain embodiments of the present invention can integrate with currently available test tools, such as JUnit, SOAPUI, and/or the like, to generate test suites for regression testing. These advantages can improve the computer system by, inter alia, enabling testing to be performed more thoroughly and with better feedback in an automated manner that can be performed more quickly, resulting in fewer code errors during the lifecycle of the computer system. Further, in an embodiment, this testing can be performed on the gateway appliance 86 on which the developed services 74 will be running without running end-to-end solution, saving time and resources. Also, in other embodiments, this testing can be performed on the gateway appliance 86 on which the developed services 74 will be running without disrupting the production runtime environment, saving time and resources.

Some or all of these advantages, as well as others, are realized by the installation of a unit test framework 88 that incorporates the components of system 72 on gateway appliance 86 running on physical server 80. To this extent, unit test framework 88 can be a software solution that operates as an integrated but separate component within the gateway appliance of physical server 80. To this extent, all or portions of unit test framework 88 can be included within hypervisor 81 or can be executed on BM physical server 80 (e.g., within or on top of the BM OS). Additionally, or in the alternative, all or portions of unit test framework 88 can be included within hypervisor 81, for example, as a stand-alone utility within gateway appliance 86, as a component of computing node 84N containing gateway appliance 86, and/or as a stand-alone computing node 84N containing gateway appliance 86 on physical server 80.

In any case, unit test framework 88 acts as a separate region integrated within gateway appliance 86 for testing developed services 74 within the environment of gateway appliance. To this extent, unit test framework 88 contains separate functions that can perform and record the results of testing operations. However, the location of unit test framework 88 within gateway appliance 86 allows unit test framework 88 to call production code modules to ensure that the developed services 74 being tested work with the remainder of the code in gateway appliance 86, as will be explained in more detail.

Referring again to FIG. 4, test request interface 90 of system 72, as included in unit test framework 88 and executed by computer system/server 12, is configured to receive a test request at unit test framework 88 on gateway appliance 86. To accomplish this, unit test framework 88 is separately accessible over HTTP. This allows unit test framework 88 to be easily integrated with standard testing tools including, but not limited to: JUnit, SOAPUI, and/or the like, which can access unit test framework 88 remotely for the purpose of performing automated testing.

In any case, user 76 (e.g., using one of the aforementioned standard testing tools) will make an HTTP request to unit test framework 88. In general, HTTP requests have 3 main parts, 1) the URL path and query string, 2) HTTP payload for PUT, PATCH, POST requests, and 3) HTTP headers. These HTTP headers control aspects of how the target test unit of developed services 74 is to be invoked, such as the function name and how parameters in the test request received at unit test framework 88 should be transformed as a result of the testing by the function being tested. To this extent, the header of the test request can include, but is not limited to, the following parameters:

function name—a header that indicates which gateway function should be invoked include-path—path to one or more files that should be included in generated dynamic code function parameters—a set of key/value pairs that describe which parameters are forwarded to the target function being tested. This can also include special tags that indicate how parameters should be transformed. For example, a parameter may come from the request body, or need to be translated into an xml node-set.

special setup—header that indicates if some special initialization code should be called before invoking the target code.

It should be understood that HTTP requests may vary among various test clients. For example, in JUnit, a common solution could involve the client using Apache HTTP client to generate the requests.

Figure 5:
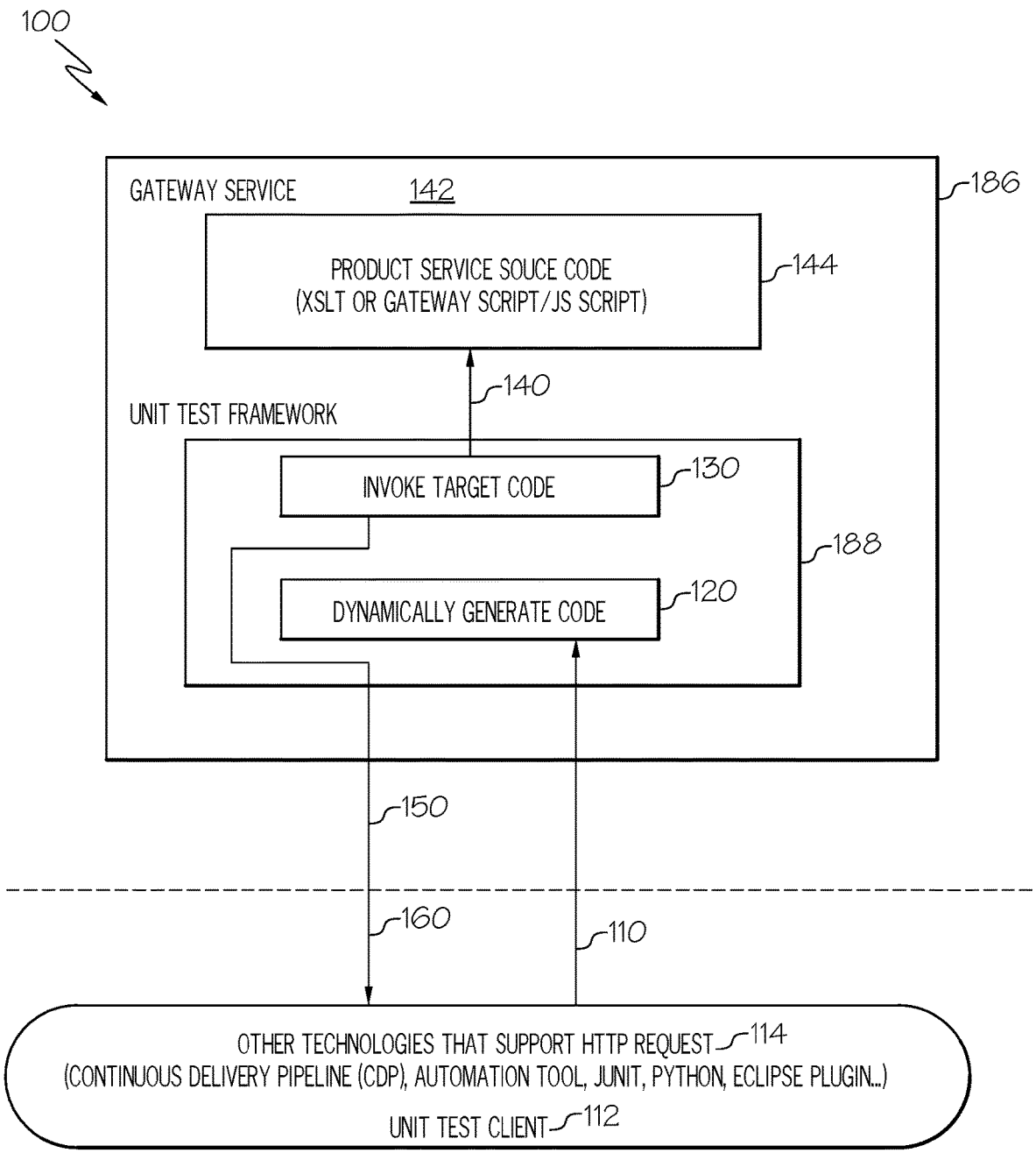
FIG. 5 depicts an example data flow diagram according to an embodiment of the present invention.

Referring now to FIG. 5, an example component diagram 100 is shown according to embodiments of the invention. As shown, a test request 110 is received from a unit test client 112 by unit test framework. As further shown, in sending test request 110 unit test client 112 can utilize a number of other technologies that support sending of HTTP requests including, but not limited to: a continuous delivery pipeline (CDP), an automation tool, JUnit, Python, and Eclipse plugin, and/or the like.

Referring again to FIG. 4 in conjunction with FIG. 5, stub code generator 92 of system 72, as included in unit test framework 88 and executed on computer system/server 12, is configured to dynamically generate a set of stub code 120 for processing the test request 110. To accomplish this, unit test framework generates dynamic code using the various input headers in the received test request 110 to control various aspects of the testing. Elements of test request, such as the target function name and include paths are combined into a new set of code. The HTTP headers that define how the function parameters should look are processed so that the end result is a set of generated parameters and code that calls the intended target function. It should be understood that the format of the generated stub code 120 may vary by platform. For example, because DataPower gateway supports XSLT and Javascript, in instances in which a DataPower gateway appliance 186 is used, the resulting stub code 120 generated may be in one of these formats.

Target function invoker 94 of system 72, as included in unit test framework 88 and executed by computer system/server 12, is configured to execute target code 140 being tested using the generated set of stub code 120. To accomplish this, unit test framework 188 dynamically invokes 130 and executes generated stub code 120. How the code is invoked 130 will vary based on the hosting gateways capabilities and what language the generated code is written in. In any case, when executed, the dynamically generated stub code 120 invokes a target function 140 of developed services 74 being unit tested. Because target function 140 is resident on gateway appliance 186, target function 140, when invoked, will run in the same environment, and accordingly function the same way it would were it to be run in a production environment in normal gateway operations. Moreover, target function 140 being tested will have the full set of gateway services 142 that would be available to any function running in the production environment because the code is running in an actual gateway 186. This integrated solution ensures that gateway logic, which often depends on using gateway specific methods to check things like URI path, query parameters, or headers, is tested with the highest level of accuracy.

Test result verifier 96 of system 72, as included in unit test framework 88 and executed by computer system/server 12, is configured to verify the result of the execution of the target code. To accomplish this, once target function 140 being tested completes, it will bubble up a response 150 that unit test framework 188 captures. In addition, unit test framework 140 can capture additional information that would not otherwise be able to be captured in current gateway interface-based testing solutions including, but not limited to, the current state of the request, including any header change the test function may have modified. All this information is bundled into an HTTP response 160 that is returned to client 112 in a predefined format the client can easily consume (JSON or XML). For example, in cases in which existing test clients 112 like JUnit and SoapUI are used to drive unit tests through unit test framework, test result verifier 96 can return the response 160 in a format that is best suited to the particular tool. As a result, these tools can easily validate the results according to their own existing methods. For instance, if the test client is JUnit, there would be Assert.assertEquals( ) calls that verify the function returned the expected response. Further, client frameworks like JUnit can also run entire suites of tests and consolidate results into reports, and further increases the advantages of automation.

Figure 6:
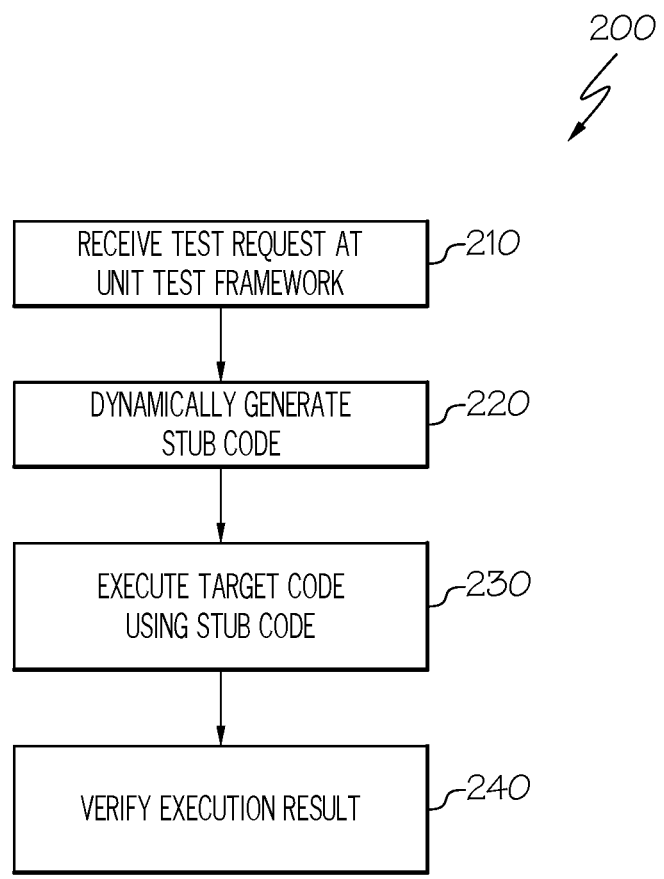
FIG. 6 depicts an example process flowchart according to an embodiment of the present invention.

Referring now to FIG. 6 in conjunction with FIG. 4, a process flowchart 200 according to an embodiment of the present invention is shown. At 210, test request interface 90 of system 72, as included in unit test framework 88 and executed by computer system/server 12, receives a test request at unit test framework 88 on gateway appliance 86. At 220, stub code generator 92, as included in unit test framework 88 and executed by computer system/server 12, dynamically generates a set of stub code for processing the test request. At 230, target function invoker 94, as included in unit test framework 88 and executed by computer system/server 12, executes target code of software services 74 using the set of stub code. At 240, test result verifier 96, as included in unit test framework 88 and executed by computer system/server 12, verifies a result of the execution of the target code.

The process flowchart of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures.

For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for integrated testing of gateway appliance services in a networked computing environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for facilitating a SDN communication. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for integrated testing of gateway appliance services in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for integrated testing of gateway appliance services in a networked computing environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for integrated testing of gateway appliance software services in a networked computing environment, comprising:
   receiving a test request at a unit test framework installed on a gateway appliance;
   dynamically generating, by the unit test framework, a set of stub code for processing the test request;
   executing, using the unit test framework, target code of the software services using the set of stub code; and
   verifying a result of the execution of the target code.

2. The method of claim 1, further comprising installing the unit test framework in the gateway appliance.

3. The method of claim 1, further comprising invoking the dynamically generated code.

4. The method of claim 1, the verifying further comprising:
   capturing a response generated as a result of the executing; and
   forwarding, by the unit test framework, the response to a sender of the request.

5. The method of claim 4, further comprising:
   calling, by the target code, a production software service in the gateway as part of the execution; and
   including a result of the calling in the capturing.

6. The method of claim 1,
   wherein the test request received at the unit test framework is sent by a test client utilizing a testing tool, and
   wherein the testing tool is selected from a group consisting of: JUnit and SOAPUI.

7. The method of claim 1,
   wherein the networked computing environment is a cloud computing environment, and
   wherein the gateway appliance controls communications to a set of virtual machines operating on a physical server in the cloud computing environment.

8. A computer program product embodied in a computer readable medium that, when executed by a computer device, performs a method for integrated testing of gateway appliance software services in a networked computing environment, the method comprising:
   receiving a test request at a unit test framework installed on a gateway appliance;
   dynamically generating, by the unit test framework, a set of stub code for processing the test request;

executing, using the unit test framework, target code of the software services using the set of stub code; and verifying a result of the execution of the target code.

9. The program product of claim 8, the method further comprising installing the unit test framework in the gateway appliance.

10. The program product of claim 8, the method further comprising invoking the dynamically generated code.

11. The program product of claim 8, the verifying further comprising:

capturing a response generated as a result of the executing; and forwarding, by the unit test framework, the response to a sender of the request.

12. The program product of claim 8, the method further comprising:

calling, by the target code, a production software service in the gateway as part of the execution; and including a result of the calling in the capturing.

13. The program product of claim 12, wherein the test request received at the unit test framework is sent by a test client utilizing a testing tool, and wherein the testing tool is selected from a group consisting of: JUnit and SOAPUI.

14. The system of claim 8, wherein the networked computing environment is a cloud computing environment, and wherein the gateway appliance controls communications to a set of virtual machines operating on a physical server in the cloud computing environment.

15. A computer system for integrated testing of gateway appliance software services in a networked computing environment, the computer system comprising:

a hardware gateway, having a gateway appliance that controls the hardware gateway;

a unit test framework installed in the gateway appliance;

a memory medium comprising instructions; a bus coupled to the memory medium; and a processor coupled to the bus that when executing the instructions cause the system to:

receive a test request at a unit test framework on a gateway appliance;

dynamically generate, by the unit test framework, a set of stub code for processing the test request;

execute, using the unit test framework, target code of the software services using the set of stub code; and verify a result of the execution of the target code.

16. The system of claim 15, the instructions further causing the system to invoke the dynamically generated code.

17. The system of claim 15, the instructions that verify further causing the system to:

capturing a response generated as a result of the executing; and forwarding, by the unit test framework, the response to a sender of the request.

18. The system of claim 17, the SDN, the instructions further causing the system to:

call, by the target code, a production software service in the gateway as part of the execution; and include a result of the calling in the capturing.

19. The system of claim 18, wherein the test request received at the unit test framework is sent by a test client utilizing a testing tool, and wherein the testing tool is selected from a group consisting of: JUnit and SOAPUI.

20. The system of claim 15, wherein the networked computing environment is a cloud computing environment, and wherein the gateway appliance controls communications to a set of virtual machines operating on a physical server in the cloud computing environment.

\* \* \* \* \*